United States Patent [19]

Worthington

[11] 4,068,652
[45] Jan. 17, 1978

[54] MULTI-PURPOSE SOLAR COLLECTOR/HEAT EXCHANGER

[76] Inventor: Mark N. Worthington, 10227 White Mountain Road, Sun City, Ariz. 85351

[21] Appl. No.: 658,475

[22] Filed: Feb. 17, 1976

Related U.S. Application Data

[63] Continuation-in-part of Ser. No. 519,521, Oct. 31, 1974, Pat. No. 3,957,109.

[51] Int. Cl.² ............................................. F24J 3/02
[52] U.S. Cl. .................................. 126/270; 126/271; 165/48; 237/1 A
[58] Field of Search ............... 126/270, 271; 237/1 A; 165/48

[56] References Cited

U.S. PATENT DOCUMENTS

| 201,439 | 3/1878 | Moreau | 126/270 |
|---|---|---|---|
| 2,529,621 | 11/1950 | Mayo | 126/270 |
| 2,601,905 | 7/1952 | Anderegg | 126/270 |
| 2,671,441 | 3/1954 | Harris | 126/270 |
| 2,918,709 | 12/1959 | Corcoran | 126/270 |
| 3,102,532 | 9/1963 | Shoemaker | 126/270 |
| 3,243,117 | 3/1966 | Morgan | 237/1 A |
| 3,254,643 | 6/1966 | Thomason | 165/48 |
| 3,563,305 | 2/1971 | Hay | 126/270 |
| 3,889,742 | 6/1975 | Rush | 237/1 A |
| 3,894,685 | 7/1975 | Keyes | 237/1 A |

*Primary Examiner*—Charles J. Myhre
*Assistant Examiner*—Daniel J. O'Connor

[57] ABSTRACT

A multi-purpose solar collector - heat exchanger that is susceptible of usage other than the heating of a house or similar premises. The heat exchanger comprises at least three flat metallic sheets and two sheets having longitudinal grooves therein. One of the grooved sheets is interposed between an outer flat sheet and an intermediate flat sheet. The other grooved sheet is interposed between the intermediate flat sheet and the other of the outermost sheets. Where apexes or bends of the longitudinal grooves meet the flat sheets, they are attached thereto. The flat sheets and grooved sheets cooperate to define a plurality of longitudinal channels. A manifold is integrally joined to the ends of the outermost flat sheets at each end of the exchanger with each manifold having a duct depending therefrom and each duct being adapted to function either as an inlet or outlet for air.

10 Claims, 10 Drawing Figures

U.S. Patent  Jan. 17, 1978  Sheet 1 of 3  4,068,652
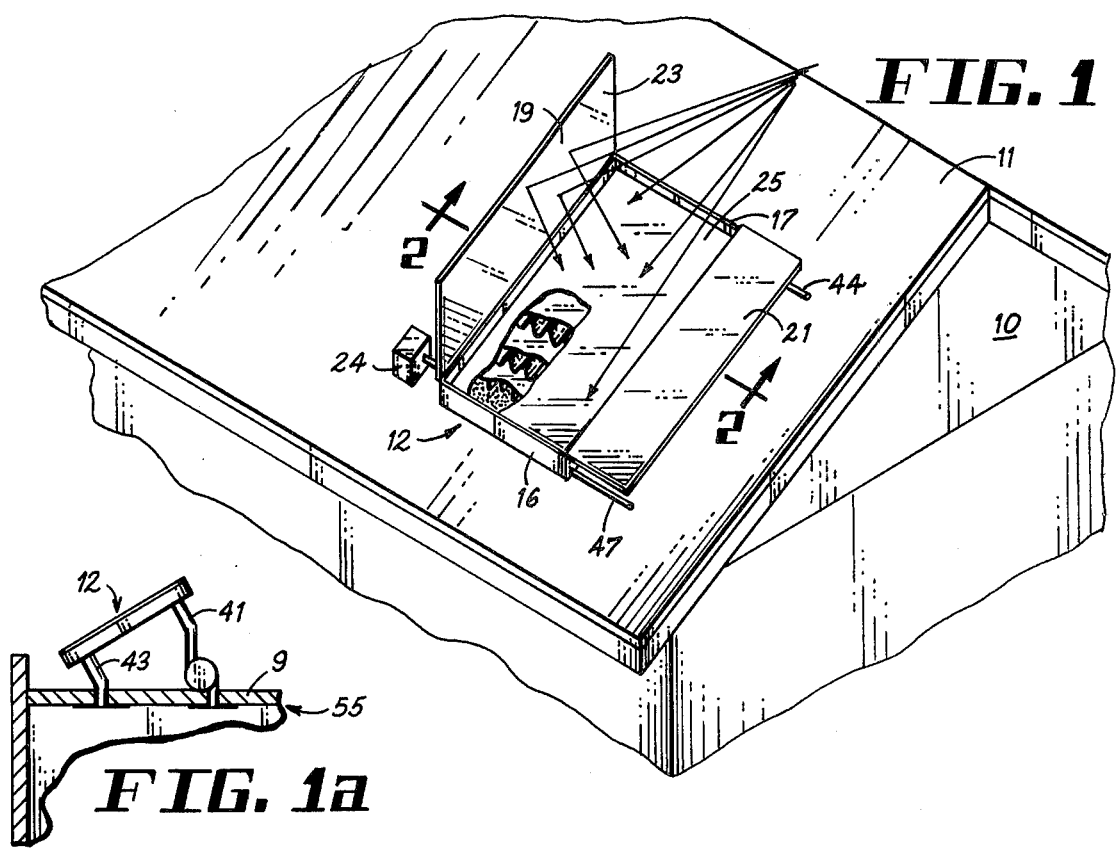
FIG. 1
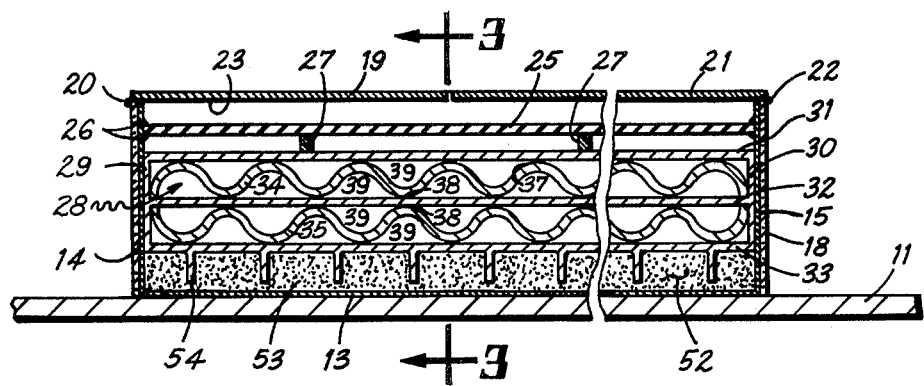
FIG. 1a
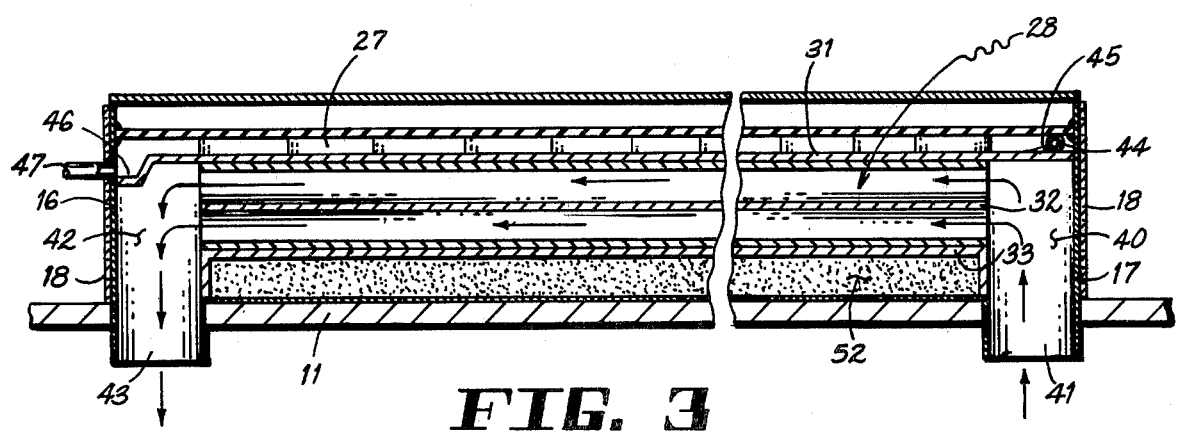
FIG. 2
FIG. 3

MULTI-PURPOSE SOLAR COLLECTOR/HEAT EXCHANGER

This application is a continuation-in-part of the copending application of Mark N. Worthington, Ser. No. 519,521, filed Oct. 31, 1974 for solar collector-heat exchanger, now U.S. Pat. No. 3,957,109.

The present invention relates to solar collector-heat exchangers and is concerned primarily with a heat exchanger of novel construction affording high efficiency in the transfer of heat and is particularly adapted not only to the heating of homes, but also for other purposes involving heat exchange.

BACKGROUND OF THE INVENTION

Due to the energy crises presently existing, the attention of engineers and inventors has been directed to solar collector-heat exchangers which are designed primarily for the heating of homes and other premises. The heat exchanger unit, that is the apparatus that actually transfers heat, is the very heart of such a solar collector-heat exchanger. If the apparatus is to be mounted on the roof of a house or other building, and particularly a home, there are space limitations which must be accommodated. Thus, if the installation is bulky and occupies too much space on the roof, it will not be acceptable to the public for either one or both of two reasons. In the first place, if it is unusually massive and has great weight it is not susceptible of installation on a presently existing building because of the necessity of the building structure supporting the weight of the exchanger; and secondly, the apparatus which is installed on a roof should be of a compact thickness and occupy a small area to avoid an unsightly appearance.

Every solar collector-heat exchanger, for its very nature, must include a surface onto which the sun's rays are directed and collected. The heat so generated must be transferred to the underside of this surface. Thus, efficiency in the transfer of heat is of the utmost importance in a solar collector-heat exchanger.

In the patent application above identified, the heat exchanger unit has many characteristics of the subject heat exchanger. Thus, it includes longitudinal channels provided by an intermediate flat sheet and corrugated sheets on either side thereof. Air is caused to flow through these channels and is either heated or cooled by the temperature which occurs on the upper side of the exchanger. A blower is provided to force air through these channels. It is deemed desirable to provide a heat exchanger which will function to achieve both heating and cooling effects without the use of a blower.

The prior art is singularly lacking in a solar collector heat exchanger which is adapted not only to heat houses and other premises by solar heat, but which is also capable of either heating or cooling these premises by passing a film of liquid of a required temperature thereover. Now known heat exchangers of the type with which this invention is concerned are also not adapted for installation in the vertical walls of a building.

OBJECTS OF THE INVENTION

With the foregoing conditions in mind, the present invention has in view the following objectives:

1. To provide a multi-purpose solar collector-heat exchanger which includes as a characteristic and essential element a heat exchanger unit which comprises an upper or outer flat metallic sheet, a grooved metallic sheet having apexes or bends attached to the inner or under face of the outer metallic sheet in a any way which insures thermal contact such as by welding, an intermediate flat metallic sheet welded to the apexes or bends of the grooved sheets, a second grooved metallic sheet the apexes or bends of which are welded to the other face of the intermediate metallic sheet, and a lower or inner flat metallic sheet welded to the second grooved metallic sheet. These flat and grooved sheets cooperate to define longitudinal channels. A manifold is provided at each end of these channels and each manifold has a duct extending therefrom.

2. To provide a multi-purpose solar collector-heat exchanger of the type aforesaid, together with a pair of complemental covers which may be hinged, retractable, or removable, having inner reflective surfaces which are adapted to be opened into positions in which they leave the upper face of the exchanger completely unobstructed from the sun's rays but with one cover assuming a position in which it reflects sun rays onto the exchanger.

3. To provide a multi-purpose solar collector-heat exchanger, of the character aforesaid, in which the ducts extend into the premises to be heated with each duct being adapted to function as either an inlet or outlet together with a blower for forcing air under pressure through one of said ducts when it functions as an inlet.

4. To provide a multi-purpose solar collector-heat exchanger, of the kind described, which includes a heat sink for storing heat derived from solar rays and which is effective to release heat when solar rays are not present.

5. To provide a multi-purpose solar collector-heat exchanger, of the type noted, which includes means for introducing a film of liquid to the uppermost end of the outermost sheet of the exchanger together with means at the other end of this outermost sheet for collecting liquid that has passed thereover.

6. To provide, in a multi-purpose solar collector-heat exchanger of the character aforesaid, a heat trap in the form of a transparent sheet that is positioned over and spaced from the heat exchanger unit.

7. To provide a multi-purpose solar collector-heat exchanger, of the kind described, which functions to either add heat to or absorb heat from premises in which it is installed by radiation alone.

8. To provide a multi-purpose solar collector-heat exchanger, of the type noted, which will heat or cool premises in which it is installed by either forced draft or gravity flow.

9. To provide a multi-purpose solar collector-heat exchanger, of the character aforesaid, which may be used to heat liquid that is recycled, stored, or used for any purpose desired.

10. To provide a multi-purpose solar collector-heat exchanger, of the kind described, which is adapted for installation on either the roof or a vertical wall of a building.

11. To provide a multi-purpose solar collector-heat exchanger, of the character aforesaid, which is susceptible of being manufactured in modules for addition to existing buildings or included in the original construction of a building.

12. To provide a multi-purpose solar collector-heat exchanger, of the kind described, which may be used to cool room air by nocturnal radiation (radiation to the night sky).

13. To provide a multi-purpose solar collector-heat exchanger, of the type noted, which may be used to heat liquid such as water.

Various other more detailed objects and advantages of the invention, such as arise in connection with carrying out the above ideas in a practical embodiment will in part become apparent, and in part, be hereinafter stated as the description of the invention proceeds.

SUMMARY OF THE INVENTION

The foregoing objects are achieved by providing a multipurpose solar collector-heat exchanger which includes as a characteristic and essential element a heat exchanger unit comprising a plurality of longitudinal channels defined by an uppermost or outer flat metallic sheet, the outer surface of which is blackened for heat absorption purposes, a metallic sheet having longitudinal grooves preferably formed by corrugations with bends of the grooves being attached to the underside of the outer flat metallic sheet, an intermediate sheet attached to the bends or apexes remote from those secured to the uppermost sheet, a second metallic sheet having longitudinal corrugations, bends of which are attached to the intermediate sheet and a bottom or lowermost metallic sheet attached to the corrugations of the second corrugated sheet.

These flat and corrugated sheets provide a multiple tier exchanger, in this instance, there being two tiers of channels. A manifold is provided at each end of the longitudinal channels. This manifold is preferably integral with the uppermost and lowermost flat sheets and includes a duct depending therefrom.

The heat exchanger unit is mounted in a frame comprising metallic side walls (having insulation on their outer surfaces) which extend above the outermost flat sheet and below the lowermost flat sheet. The frame also includes a bottom metallic wall which is mounted on a roof or wall of a building and which cooperates with the lowermost sheet of the heat exchanger unit and lower portion of the side walls to define a so called heat sink in the form of a chamber which contains heat absorbing materials. A plurality of ribs are formed integral with the lowermost sheet of the heat exchanger unit, depend therefrom, and extend into the heat absorbing materials.

A heat trap is supported above the uppermost sheet of the heat exchanger unit in spaced relation thereto. It is of transparent material with its side edges being supported by the side walls of the frame and additional intermediate supports on the uppermost sheet.

A pair of complemental covers are hingedly, retractably, or removably mounted on the upper edges of the side walls. The under surface of these covers are coated with a light-reflecting material. Apparatus is provided for moving these covers into positions in which the heat exchanger unit is always totally exposed to solar rays with one cover being in a position to reflect solar rays onto the heat exchanger unit. Such apparatus may include timing mechanism which causes the covers and reflecting portions to be in proper relation with respect to the earth's rotations. These covers may also be moved manually without the timing mechanism.

With the apparatus so far described mounted on a roof, which may have an angle of from 30° to 45° with respect to the horizontal, the duct from the upper end of the heat exchanger unit extends into a blower and thence into the premises the temperature of which is to be controlled. The duct from the other end also extends into these premises.

A perforated pipe extends from an appropriate source of liquid, which may be either hot or cold, across the upper end of the uppermost sheet of the heat exchanger unit. The liquid is literally jetted onto this sheet at its uppermost end to form a film which flows downwardly over the sheet to a trough at its lower end. A drain pipe communicates with this trough and extends to a desired point of disposal or back to the original source of the liquid for recycling. In some instances it may go to a receptacle for storing hot or cold liquid.

The apparatus may also be used for heating its own liquid instead of using a hot liquid from an outside source. In this case one of the covers is wide open and the other is positioned by hand or mechanical operation to reflect additional solar rays from its reflective surface onto the heat trap. Water or a similar liquid is introduced through the feed pipe at the upper end of the heat exchanger unit and flows down onto the blackened upper exchanger surface where it absorbs the heat imparted to this surface by the sun's rays. The heated liquid flows down and out through the drain pipe to a storage tank. From the storage tank the liquid is recycled through the feed pipe and the operation as described above is repeated. As the recycling is continued the liquid in the storage tank gradually heats up to a temperature approaching that of the solar collector surface. This stored liquid may than be used later or at night to heat the premises by means of the heat exchanger as previously described.

In a modified embodiment a blackened sheet is interposed between the upper surface of the heat exchanger unit and the heat trap to inhibit condensation of vapors emanating from the liquid flowing down the upper surface of the heat exchanger and prevent solar rays being reflected from this liquid.

When the apparatus is installed in the vertical wall of a building it will actually replace a portion of such a wall. In such an installation, the ducts from the manifold merely open onto the surface defining the inner side of the wall. The blower or fan is mounted in the uppermost duct.

For a full and more complete understanding of the invention, reference may be had to the following description and accompanying drawings wherein:

FIG. 1 is a perspective illustrating a portion of a slanted roof with the multi-purpose solar collector-heat exchanger mounted thereon and depicting one position of the open covers.

FIG. 1a is a view which is largely diagrammatic, illustrating how the exchanger may be mounted on a flat roof.

FIG. 2 is a transverse vertical section taken about on the plane of the line 2—2 of FIG. 1 and broken away to permit of illustration on an enlarged scale.

FIG. 3 is a longitudinal vertical section taken on the plane of the line 3—3 of FIG. 2.

FIG. 3a is a longitudinal vertical section similar to FIG. 3 of the modified embodiment of FIG. 2a.

DESCRIPTION OF PREFERRED EMBODIMENT

Figure 5:
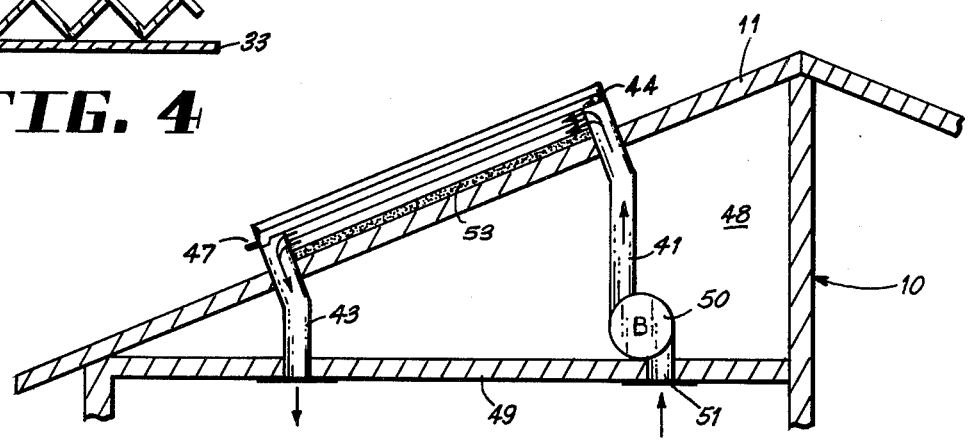
FIG. 5 is a sectional view depicting the flow of air when the blower is in operation.

Referring now to the drawings wherein like reference characters denote corresponding elements throughout the several views, and first more particularly to FIGS. 1 and 5, a building 10 includes an inclined or tilted roof section 11. This roof section 11 may be inclined at an angle ranging from 30° to 45° with respect to the horizontal. The multi-purpose solar collector heat exchanger of this invention is shown as mounted on roof section 11 and is identified in its entirety by the reference character 12. Exchanger 12 includes a frame comprising a bottom 13, side walls 14 and 15, and end walls 16 and 17. Walls 14, 15, 16, and 17 are covered on their outer exposed surface with insulation, all such insulation being designated 18. A cover 19 is hingedly mounted as indicated at 20 on the upper edge of said wall 14. Second cover 21 is hingedly mounted as indicated at 22 on the upper edge of side wall 15. Covers 19 and 21 complement one another to completely close off the open top of the frame when in closed position. The inner surface of each of these covers 19 and 21 is lined or coated with a reflecting material 23. This reflecting material may be a light colored paint, metal, mirror, or any other reflective substance.

Apparatus for controlling opening and closing of covers 19 and 21 is represented diagrammatically at 24. It will be understood that with the covers in the position depicted in FIG. 1, the open top of the frame will receive rays directly from the sun, in addition solar rays will reflect from the surface 23 onto the heat exchanger unit to be later described. The control 24 will include timing mechanism for swinging the covers in relation to the earth's rotation to secure delivery of the maximum amount of solar rays to and through the open top of the frame.

A heat trap 25 extends completely between side walls 14 and 15 and also completely between end walls 16 and 17. This heat trap may be made of any transparent or semi-transparent material such as glass, fiberglass, or any of the various number of plastics. It is supported in position by sealing strips 26 which may be plastic, wood, or metal. These sealing strips are applied to the side and end walls to support the heat trap 25 therefrom. Additional support may be provided by longitudinal strips 27 which depend from heat trap 25 and are supported by the heat exchanger unit now to be described.

The heat exchanger unit is referred to in its entirety by the reference character 28. It comprises a side metallic plate 29 secured to side wall 14 in any appropriate manner, another side plate 30 secured to side wall 15, a top flat sheet 31 and intermediate metallic sheet 32, a bottom flat sheet 33, an upper corrugated sheet 34 and lower corrugated sheet 35.

Figure 4:
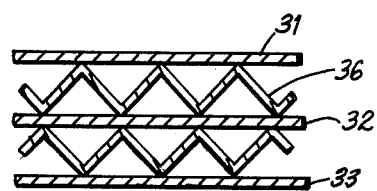
FIG. 4 is a detail on an enlarged scale of a modified form of the grooved sheets in which the grooves are defined by flat sided V's.

Corrugated sheets 34 and 35 constitute longitudinally grooved sheets. Upon referring to FIG. 4 it will be noted that another form of longitudinally grooved sheet is therein illustrated in which the grooves are defined by flat sided V's 36.

The upper surface of sheet 31 is blackened to impart heat absorbing properties thereto. Any conventional blacking material may be used. The upper bends of corrugated sheet 34 are secured to the lower face of sheet 31 in any desired manner that will insure a good thermal contact such as by welding or riveting. These welded bends are indicated at 37. The bends of corrugated sheet 34 remote from those at 37 are welded to intermediate sheet 32 as indicated at 38. In a similar manner, the bends of the corrugated sheet 35 are welded to the underside of intermediate sheet 32 and the upper side of lower sheet 33. Thus, the sheets 31, 32, 33, 34, and 35, define longitudinal channels 39.

It will be noted from FIG. 3 that upper sheet 31 extends the entire longitudinal length between end walls 16 and 17. Whereas sheets 32 and 33 are of a lesser longitudinal dimension. Thus, a manifold 40 is defined at the upper end of the heat exchanger unit by that portion of sheet 31 which extends beyond sheets 32 and 33, end wall 17 of the frame, bottom 13, and side walls 14 and 15 of the frame. Depending from this manifold 40 is a duct 41 which as illustrated in FIG. 5 communicates with an opening in bottom 13 substantially midway side walls 14 and 15 and passes through an opening in roof 11. Similarly a second manifold 42 is defined at the lower end of the heat exchanger unit by that portion of sheet 31 which projects beyond sheets 32 and 33, bottom 13, end wall 16, and side walls 14 and 15 of the frame.

Another duct 43 is formed integral with manifold 42 and communicates with an opening in bottom 13, midway side walls 14 and 15, and passes through an opening in roof 11.

As shown more clearly in FIGS. 1 and 3, a pipe 44 passes through side wall 15 and extends across the upper end of sheet 31. This pipe communicates with a source of liquid under pressure which may be either hot or cold depending on the function to be performed by the heat exchanger. Along the entire extent of this pipe which overlies sheet 31 it is perforated along its inner side to provide for the liquid being emitted from the pipe in the form of jets which are indicated at 45. These jets form a film across the upper end of sheet 31. The film of liquid flows downwardly into a trough 46 formed in sheet 31 at the end remote from pipe 44. A drain pipe 47 takes the liquid from trough 46 and either delivers it to any suitable disposal point or returns it to the source of liquid which supplies liquid to pipe 44 for recycling.

The apparatus may also be used for heating it's own liquid instead of using a hot liquid from an outside source. In this case one of the covers 19 or 21 is wide open and the other is positioned by hand or mechanical operation 24 to reflect additional sun rays from reflective surface 23 onto heat trap 25. Water or a similar liquid is introduced through pipe 44 and down over the blackened, upper exchanger surface 31 where it absorbs the heat imparted to surface 31 by the sun's rays. The heated liquid flows down and out through pipe 47 to a storage tank (not shown). From the storage tank the liquid is recycled through feed pipe 44 and the operation as described above is repeated. As the recycling is continued the liquid in the storage tank gradually heats up to a temperature approaching that of the solar collector surface 31. The stored hot liquid may then be used later or at night to heat the premises by means of the heat exchanger as previously described.

As illustrated in FIG. 5, a house 10 includes an attic 48 that is defined by a horizontal ceiling 49 of a room therebeneath. Blower 50 is supported by ceiling 49 and is connected to the lower end of duct 41. Blower 50 has an intake grill 51 which passes through an opening in ceiling 49. Duct 43 passes through another opening in ceiling 49 as illustrated in FIG. 5.

Referring now more particularly to FIG. 2, it will be noted that bottom wall 13, flat sheet 33, those portions of side walls 14 and 15 which extend below sheet 33, define a chamber 52 which constitutes a heat sink. It is given the capability of functioning as a heat sink because it is filled with a heat storage material represented at 53. This material may be water, sand, gravel, pebbles, or any other material or combination of materials which have the capacity to have heat stored therein. As shown in FIG. 2, a plurality of ribs 54 depend from metallic sheet 33 and extend into the chamber 52 to a point spaced slightly from bottom flat wall 13. These ribs 54 may be formed integral with sheet 33 or fused thereto as by welding or soldering.

OPERATION OF THE ROOF INSTALLATION

The above described apparatus is susceptible of being operated under several conditions and to achieve various purposes. Let us first assume that the premises in house 10 beneath ceiling 49 are to be heated by solar rays. Assuming that the time of day is proper, cover 21 is swung into the horizontal position depicted in FIG. 1 and cover 19 assumes the erect position. Control mechanism 24 is started in operation so that the heat trap 25 is exposed to direct rays from the sun and also the rays reflected by the surface 23 onto the heat exchanger unit 28. These rays pass through heat trap 25 and serve to heat flat upper sheet 31 of the heat exchanger unit. This heat is transmitted through sheet 31, corrugated sheet 34, intermediate sheet 32, corrugated sheet 35, bottom sheet 33, and ribs 54 by conduction.

With blower 50 in operation, cool air from the premises below ceiling 49 will be drawn upwardly and forced through duct 41 and manifold 40. From the latter, the air is fed under pressure into the upper ends of channels 39. As the air travels downwardly through these channels it acquires heat from the surfaces which define the channels. It is then forced downwardly through manifold 42 and duct 43 into the room to be heated.

During the periods of normal operation as above described, heat is stored in the heat sink 52. Should clouds obscure the solar rays for brief intervals, heat will be released from the heat sink and heat the air which passes through the channels 39. Under some climatic conditions it may be possible to heat premises for an hour or two after sundown by heat from the heat sink.

For heating during nighttime and long periods of cloudy skies, which block the sun, hot liquid such as water from any appropriate source such as waste hot water, is introduced into pipe 44. It is emitted through perforations in this pipe as jets 45 which form a film of water across the upper end of sheet 31. As this heated film of water flows down sheet 31 heat therefrom is transmitted to the heat exchanger unit 28 to heat air passing through channels 39 in exactly the same manner above described.

During periods of more moderate temperatures, the premises may be heated without operating blower 50. In such cases, the flow of heated air is the reverse of that above described when blower 50 is being operated. Thus, heated air is drawn into the lower end of duct 43 by thermo-siphonic action and into the lower ends of channels 39. This air will be heated by solar rays and will rise upwardly in channels 39 sufficient to create a draft which will force heated air from the upper ends of channels 39 downwardly through duct 41.

The premises may also be cooled by introducing a liquid such as water at a desired temperature from an appropriate source such as a spring, stream, pond, lake or water cooled by evaporation, into pipe 44 and the operation is exactly the same as that above described when the premises are heated by introducing hot water into pipe 45 with one possible exception. When the premises are being heated the draft of air is forced downwardly against the tendency of heated air to rise. When the premises are being cooled, the draft is increased due to the gravity effect which is created by the tendency of cold air to fall or drop. When the air is being cooled covers 19 and 21 are closed to keep out the sun's rays. Also, storage sink 52 now stores cold instead of heat as previously described.

Considerable cooling may be obtained at night by the phenomenon known as nocturnal radiation wherein all warm bodies radiate heat to the night sky. In this case covers 19 and 21 are wide open so that the entire upper surface of the exchanger is exposed to the sky. Blower 50 is turned on and the room air circulates through the exchanger causing the upper surface 31 to become as warm as the room air. This heat is then dissipated to the night sky by radiation. Cooling by night radiation may be increased if the transparent heat trap 25 is constructed so that it may be removed at night.

FLAT ROOF MODIFICATION

Referring to FIG. 1a a building 55 has a flat roof 9, the heat exchanger 12 is mounted on roof 9 by ducts 41 and 43 which are substantially the same as described above in connection with FIG. 5 with the exception that they do not pass through any openings in roof section 11. The exchanger 12 is supported from roof 9 by suitable framing rather than from roof section 11.

VERTICAL WALL INSTALLATION

Figure 6:
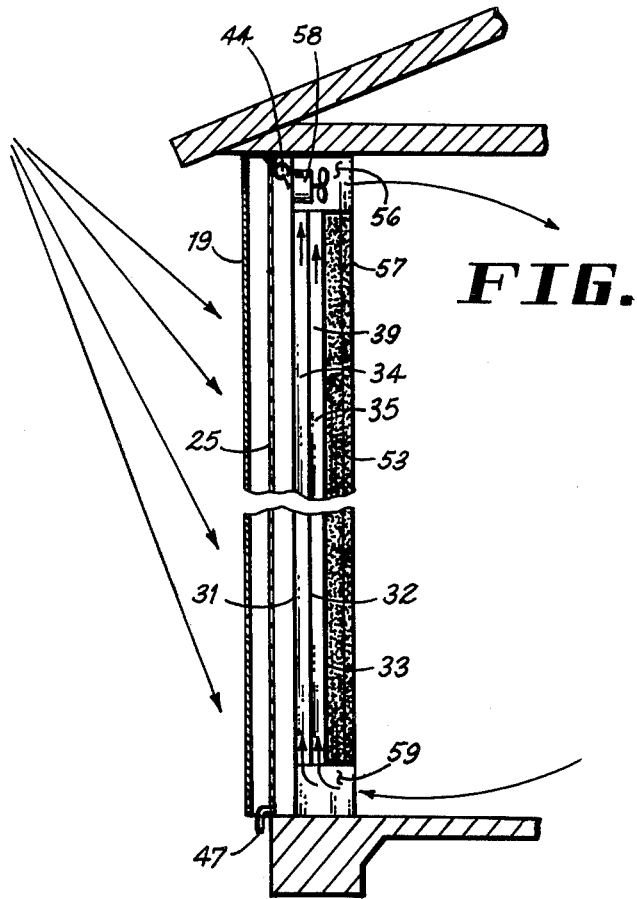
FIG. 6 is a sectional view of the vertical wall installation.
Figure 6A:
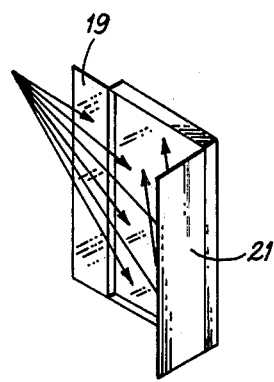
FIG. 6a is a detail showing the open portions of the covers for the installation of FIG. 6.

The apparatus as installed in a vertical wall is illustrated in FIGS. 6 and 6a. This apparatus includes most of the elements of the roof installation and such elements have been designated by corresponding reference characters. Thus the heat exchanger unit includes outer flat metallic sheet 31, intermediate sheet 32, and inner metallic sheet 33 with corrugated sheets interposed therebetween to define the longitudinal or vertical channels 39. The upper ends of these channels open onto an upper manifold 56 which is substantially the same as manifold 40 of FIG. 3 but with the notable exception that it terminates at wall surface 57 and has a fan 58 mounted therein. Lower manifold 59 communicates with the lower ends of channels 39 and it also terminates at wall surface 57. Heat sink 52 is formed between inner sheet 33 and the wall member which presents surface 57. This wall member corresponds to bottom wall 13 of the frame in FIG. 2.

The operation of the wall installation is believed to be obvious from the above description of the operation of the roof installation. It is noted that the covers 19 and 21 are opened but are shown in a reversed position from that depicted in FIG. 1. Solar rays are directed onto heat trap 25 both directly and by reflection. With fan 58 in operation cold air is drawn into manifold 59 and passes upwardly through channels 39 by which it is heated and is discharged by manifold 56 at the top. The premises may be heated by introducing hot water from any source into pipe 44 which presents a film of water which passes downwardly over the outerface of sheet 31. The premises may also be cooled by introducing cold water from any source into pipe 44. In such cases the fan 58 will overcome the tendency of cold air to move downwardly.

The wall type installation has some advantages over the roof installation. One distinct and important advantage is that the inside surface 57 becomes in effect a radiator when the unit is being used for heating. The materials in the heat sink 53 become warm and impart their heat to surface 57 which in turn radiates its heat to the room, its occupants and contents. Thus, two forms of heating are taking place simultaneously, namely, radiant heat and convected heat of the room air circulating through the exchanger. The radiant heat from surface 57 will continue several hours after the blower has been turned off or the sun isn't shining.

When the wall installation is being used for cooling the heat sink materials 53 store cold and then the reverse process of heating takes place, that is, the room, walls, contents, and occupants radiate their heat to the cold surface 57 where it is absorbed and dissipated through the exchanger to the cold fluid passing over surface 31.

A further advantage of the wall unit is that because of its vertical position a chimney effect in channels 39 causes the air to flow upwardly by gravity more rapidly than in the roof installation. This greater volume of air makes it possible to accomplish more heating without using the fan, and in milder weather is sufficient to heat the premises without any power at all.

Still a third advantage of the wall unit is that its location makes it conveniently accessible. Thus, the covers 19 and 21 may be opened or closed by hand or adjusted to reflect the maximum sun rays onto the exchanger.

MODIFIED HEAT EXCHANGER UNIT

Figure 2A:
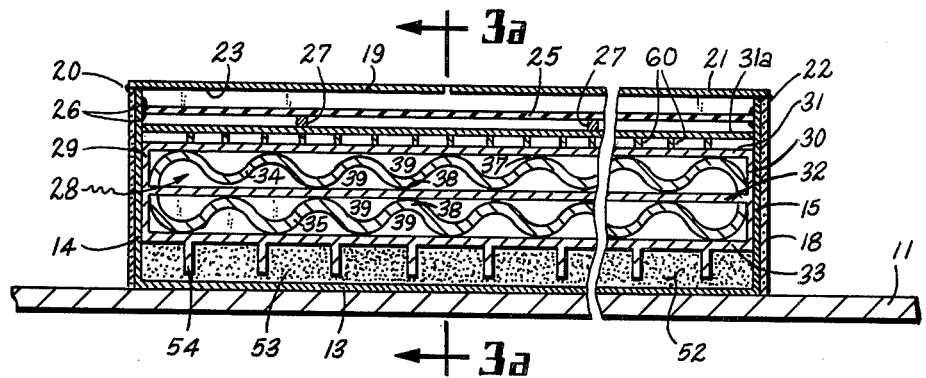
FIG. 2a is a transverse vertical section similar to FIG. 2 of a modified embodiment.
Figure 3A:
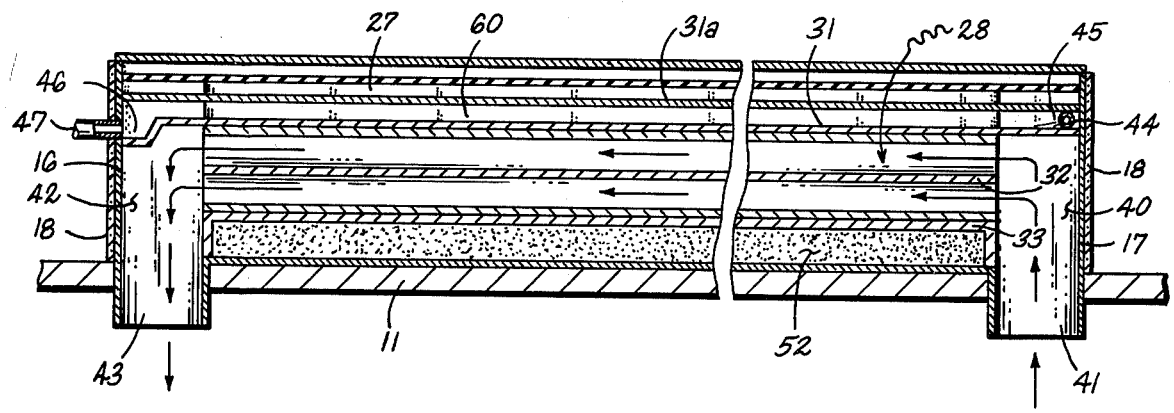

Referring now to FIGS. 2a and 3a, a modified embodiment of the heat exchanger unit will be described. It will be noted from FIGS. 2 and 3 that water from pipe 44 flows downwardly over the upper surface of sheet 31. It is thus heated which results in vapors emanating from the water and these vapors tend to condense on the undersurface of heat trap 25. This condensation impairs the transparency of heat trap 25. Moreover, some portion of the solar rays passing through heat trap 25 are reflected by the water on sheet 31 and are, therefore lost, so far as heating is concerned.

To avoid these undesirable factors, a blackened sheet 31a is interposed between heat trap 25 and sheet 31. It is supported from sheet 31 by longitudinal ribs 60. Feed pipe 44 is now positioned over sheet 31 and below condensation and reflection preventing sheet 31a. The remaining elements are the same as those illustrated in FIGS. 2 and 3 and have the same reference characters.

While preferred specific embodiments of the invention are herein disclosed it is to be clearly understood that the invention is not limited to the exact construction, mechanisms, and devices illustrated and described because various modifications of these details may be provided in putting the invention into practice.

What is claimed is:

1. In a multi-purpose solar collector-heat exchanger intended for installation in a building in a position having a vertical component,
   a. a multiple tier unit providing a plurality of longitudinal channels in parallel relation and comprising three flat metallic sheets arranged in spaced relation with two longitudinally grooved sheets each of which is interposed between a pair of adjacent flat sheets and secured thereto, said flat and grooved sheets cooperating to define two tiers of longitudinal channels,
   b. a manifold at each end of said channels communicating with all of said channels,
   c. a duct extending from and communicating with each of said manifolds, one of said ducts constituting an air inlet and the other duct an air outlet,
   d. a frame comprising bottom, side and end walls providing an open top, and enclosing said flat and grooved sheets and said manifolds,
   e. a transparent heat trap supported by said frame in spaced relation with respect to the uppermost of said flat sheets,
   f. a perforated pipe extending across the upper end of the uppermost of said flat sheets and communicating with a source of liquid under pressure and of a desired temperature whereby jets of said liquid are delivered onto the upper end of the uppermost of said flat sheets to form a film of liquid thereon, and
   g. a trough at the lower end of the uppermost of said flat sheets which receives said liquid after it has passed over the uppermost of said flat sheets, said trough having a drain pipe communicating therewith.

2. The multi-purpose solar collector-heat exchanger of claim 1 in which said longitudinally grooved sheets are corrugated sheets with bends of the corrugated sheets secured to said flat sheets.

3. The multi-purpose solar collector-heat exchanger of claim 1 together with a pair of covers each of which is hingedly mounted on the upper edge of one of said side walls and having its inner surface coated with a reflective material, said covers when in aligned position closing the open top of said frame.

4. The multi-purpose solar collector-heat exchanger of claim 3 together with control apparatus for timing swinging movement of said covers in relation to the rotation of the earth.

5. The multi-purpose solar collector-heat exchanger of claim 1 together with a heat sink below the lowermost of said flat sheets and comprising a chamber receiving a heat absorbing material.

6. The multi-purpose solar collector-heat exchanger of claim 5 together with a plurality of longitudinal ribs depending from the lowermost of said flat sheets and embedded in said heat absorbing material.

7. The multi-purpose solar collector-heat exchanger of claim 1 together with a blower in the duct constituting the air inlet.

8. The multi-purpose solar collector-heat exchanger of claim 1 in which the exchanger is installed in a vertical position and the bottom wall of the frame assumes a vertical position with the ducts terminating in the plane of said wall in the vertical position together with a fan in the uppermost of said manifolds.

9. The multi-purpose solar collector-heat exchanger of claim 1 in which a condensation reflection inhibitor in the form of a blackened sheet is interposed between the heat trap and the uppermost of said flat sheets and the perforated pipe is interposed between the condensation reflection inhibitor sheet and the uppermost of said flat sheets.

10. The multi-purpose solar collector-heat exchanger of claim 9 in which the condensation reflection inhibitor is supported from the uppermost of said flat sheets by a plurality of longitudinal ribs.

* * * * *